United States Patent
Hsieh et al.

(10) Patent No.: US 7,101,055 B2
(45) Date of Patent: Sep. 5, 2006

(54) DIRECT BACK LIGHT UNIT WITH HEAT EXCHANGE

(75) Inventors: Chin-Kun Hsieh, Hsin-Chu (TW); Chuan-Pei Yu, I-Lan Hsien (TW); Han-Chou Liu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 143 days.

(21) Appl. No.: 10/708,331

(22) Filed: Feb. 24, 2004

(65) Prior Publication Data

US 2004/0228110 A1 Nov. 18, 2004

(30) Foreign Application Priority Data

May 15, 2003 (TW) .............................. 92113213 A

(51) Int. Cl.
G02F 1/1335 (2006.01)
G01D 11/28 (2006.01)
(52) U.S. Cl. .................. 362/29; 362/294; 349/58
(58) Field of Classification Search ............ 362/29, 362/613, 632–634, 30, 294; 349/58, 65, 349/61
See application file for complete search history.

(56) References Cited

U.S. PATENT DOCUMENTS

| | | | |
|---|---|---|---|
| 4,729,076 A * | 3/1988 | Masami et al. ............ 362/235 |
| 6,089,739 A * | 7/2000 | Yamamoto et al. ......... 362/561 |
| 6,417,832 B1 * | 7/2002 | Skinner et al. ............. 345/102 |
| 6,515,857 B1 * | 2/2003 | Ford et al. .................. 361/687 |
| 6,697,130 B1 * | 2/2004 | Weindorf et al. ............. 349/65 |
| 6,847,173 B1 * | 1/2005 | Berthou et al. .......... 315/169.3 |
| 2002/0113919 A1 * | 8/2002 | Liu et al. ...................... 349/65 |
| 2003/0039113 A1 * | 2/2003 | Murr et al. ................... 362/31 |
| 2003/0053007 A1 * | 3/2003 | Higashi ....................... 349/65 |
| 2005/0007755 A1 * | 1/2005 | Yu et al. ...................... 362/31 |

FOREIGN PATENT DOCUMENTS

JP 08-136918 * 5/1996

OTHER PUBLICATIONS

Kobayashi et al., English Translation of JP 08136918 A, pp. 1-7.*

* cited by examiner

*Primary Examiner*—Sandra O'Shea
*Assistant Examiner*—James W Cranson, Jr.
(74) *Attorney, Agent, or Firm*—Winston Hsu

(57) ABSTRACT

A backlight unit with high thermal dissipation. The back light unit includes a light source generator positioned in a backside of a display panel for providing light beams to the display panel, a diffuser positioned between the light source generator and the display panel for uniformly scattering light beams from the light source generator to the display panel, and a housing enclosing the light source generator and connecting to the diffuser for reflecting the light beams to the diffuser. The housing further includes a heat pipe for being a heat transfer interface between the back light unit and an external environment.

20 Claims, 7 Drawing Sheets

DIRECT BACK LIGHT UNIT WITH HEAT EXCHANGE

BACKGROUND OF INVENTION

1. Field of the Invention

The invention relates to a back light unit, and more particularly, to a back light unit with high thermal dissipation.

2. Description of the Prior Art

A back light unit is one of the key elements of liquid crystal display (LCD) panel and is applied to many modern electric devices, such as a digital camera, mobile phone, person digital assistant (PDA), computer monitor, and flat television. In general, the back light unit is set in the backside of a display panel. The back light unit comprises a light source generator, a diffuser positioned on the light source generator for uniformly scattering the light beams from the light source generator, and a plurality of prisms positioned on the diffuser to raise the brightness and make the lightness of the whole display panel uniform. There are two types of back light units: direct-underlying type and edge light type. In a direct-underlying type, the light source generator is positioned in the backside of the display panel. Because there are more spaces in the back-side of the display panel, the light source generator may contain more than two florescent tubes to increase the lightness. As a result, a display panel requiring higher lightness or larger size, such as LCD monitor or LCD television used outside, adopts the direct-underlying type being its back light unit. On the other hand, an edge type back light unit comprises a light resource set in a flank of the display panel so as to reduce the thickness of the display panel. Therefore an edge type back light unit can satisfy the requirements of being thin, light, and saving power when applied to an LCD monitor or notebook.

FIG. 1 is a section view of a direct-underlying type back light unit 10 according to the prior art. The direct-underlying type back light unit 10, which is set in a back-side of a display panel 20, comprises a light source generator 12, a diffuser 16 set between the light source generator 12 and the display panel 20, a housing 18 enclosing the light source generator 12, and a reflecting sheet 14 set under the light source generator 12 and fixed on the inside surface of the housing 18. The light source generator 12 is used to supply a light source to emit light beams to the display panel 20. The reflecting sheet 14 is used for reflecting light beams from the light source generator 12 up to the diffuser 16 to raise the utility of the light beams. The diffuser 16 can further scatter the light beams to provide uniformly scattered light beams to the display panel 20. The housing 18 is used to position the diffuser 16, reflecting sheet 14, and the light source generator 12. The direct-underlying type back light unit 10 according to the prior art usually further comprises a diffusion film and a plurality of prisms (not shown) set on the diffuser 16 to correct the lightness and uniformity of the back light unit, wherein the amount and position of the diffusion film and the prism is different according to the design and requirements of the display panel.

For achieving the goal of high lightness and thinness, the light source generator of a back light unit is usually set in an airtight chamber, thus it is hard to radiate the heat produced by the display panel and the back light unit to the external environment when the display panel is operated. As the operation time becomes longer, the heat in the back light unit is accumulated and it results in the temperature around the fluorescent tubes being too high to maintain normal operation, so that the performance of the display panel will be reduced (for example, a portion of the image may flash) and the lifetime of the elements of the back light unit will be shortened.

For improving the heat dissipation of a back light unit, JPN 2001-297623 disclosed using vent holes and a fan to be the heat transferring device of the back light unit. It taught setting a plurality of small holes on the housing of the back light unit to serve as vent holes, and to set a fan outside the vent holes to create a heat convection between the back light unit and the external environment. However, as the vent holes and the fan are set, the noise of the van occurs and the dust easily intrudes into the back light unit to reduce the utility of the light. In JPN 2001-216870, a radiating area of the back light unit is increased to improve the heat dissipation of the back light unit, which means the housing of the fluorescent tubes electrodes is made as bended shapes. However, there is still a limitation of increasing the radiating area according to JPN 2001-216870, thus only a small amount of heat can be dissipated, and the heat accumulation problem of the back light unit is not solved yet. Therefore how to improve the heat dissipation of the back light unit and simultaneously raise the utility of light of the display panel, and furthermore to improve the display performance and extend the lifetime of the device is an important issue for manufactures of back light units.

SUMMARY OF INVENTION

It is therefore one object of the present invention to provide a back light unit with high thermal dissipation to solve the above-mentioned problem.

According to the claimed invention, the back light unit comprises a light source generator for providing light beams to the display panel, a diffuser set between the light source generator and the display panel for uniformly scattering light beams to the display panel, and a housing enclosing the light source generator and connecting to the diffuser. The housing further comprises a plurality of heat pipes for being a heat transfer interface between the back light unit and the external environment.

It is an advantage of the claimed invention that the back light unit comprises a plurality of heat pipes with high thermal conductivity set in the housing so that the internal portion of the back light unit can be maintained in an isothermal state. It can avoid heat being seriously accumulated around the light source generator, thus the problem of the internal devices of the back light unit being damaged by the high temperature or nun-uniform temperature distribution is solved. As a result, the claimed invention can improve the heat transfer of a back light unit, and furthermore raise the utility of light and lightness of the back light unit to make the display panel have a better performance and a longer lifetime.

These and other objects of the present invention will be apparent to those of ordinary skill in the art after having read the following detailed description of the preferred embodiment that is illustrated in the various figures and drawings.

DETAILED DESCRIPTION

The primary advantage of the present invention is that the present invention back light unit contains a plurality of heat pipes with high thermal conductivity formed on the housing so that the internal portion of the back light unit can be maintained in an isothermal state to avoid heat being accumulated around the light source generator and the heat dissipation effect can be increased.

Figure 1:
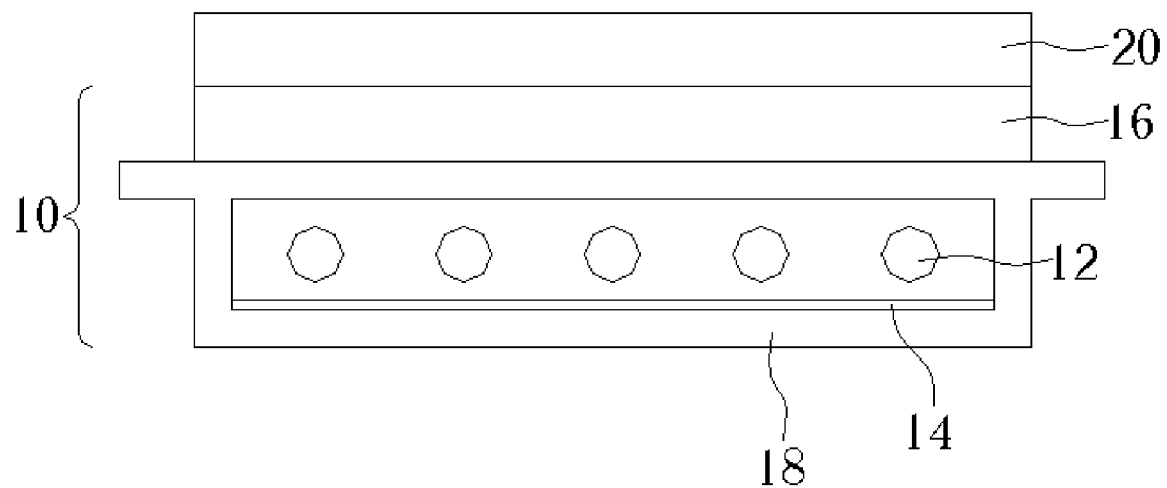
FIG. 1 is a section view of a direct-underlying type back light unit according to the prior art.
Figure 2:
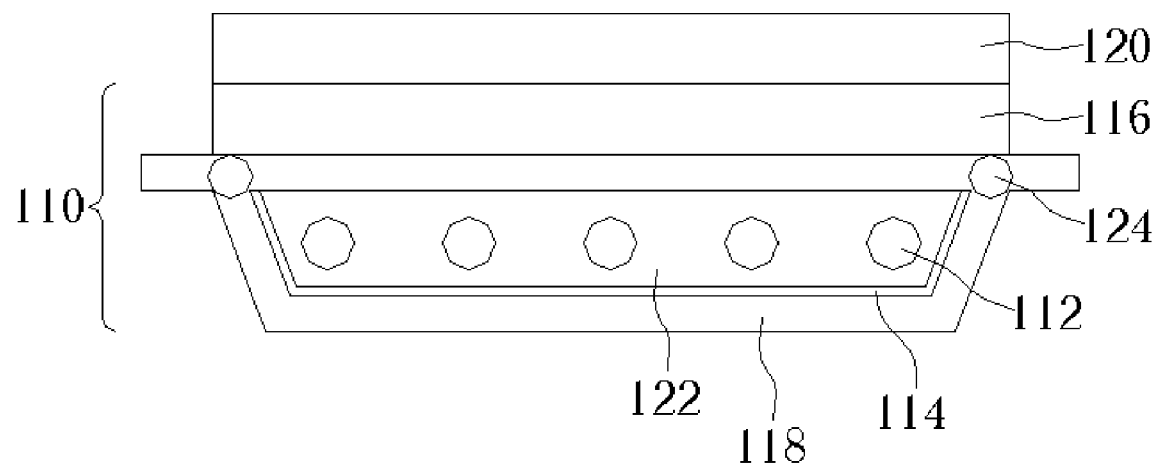
FIG. 2 is a section view of a back light unit according to the first embodiment of the present invention.
Figure 3:
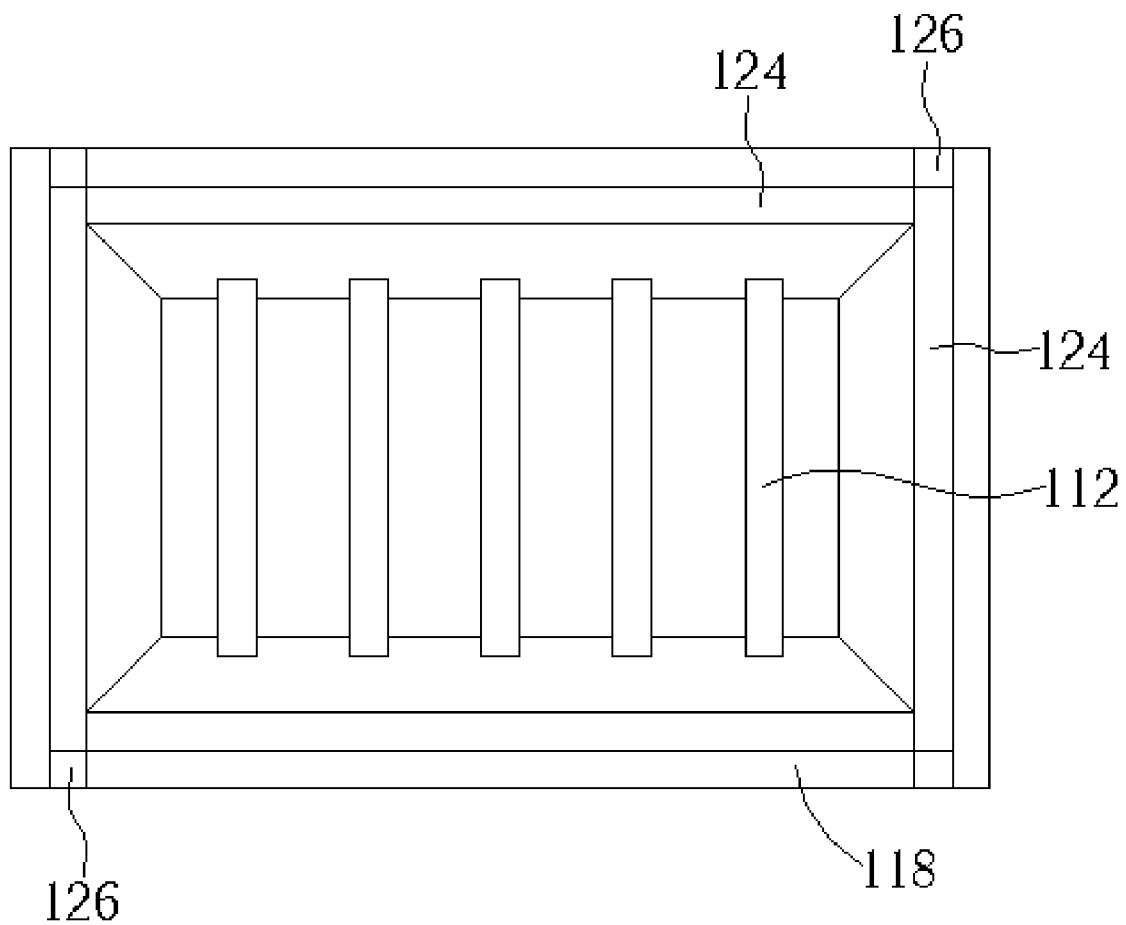
FIG. 3 is a top view of the back light unit in FIG. 2.

FIG. 2 is a section view of a back light unit 110 according to the first embodiment of the present invention. FIG. 3 is a top view of the back light unit 110 in FIG. 2. The back light unit 110 is a direct-underlying type back light unit set in the backside of a display panel 120, which comprises a diffuser 116, a light source generator 112 set under the diffuser 116, and a housing 118 enclosing the light source generator 112. The back light unit 110 also comprises a diffusion film and a plurality of prisms (not shown) set on the diffuser 116 to correct the lightness and uniformity of the back light unit 110. The sidewalls of the housing 118 extend up to connect to the edge of the diffuser 116 so that a chamber 122 is formed inside the housing 118. On the inside surface of the housing 118 is a layer of reflecting film 114 so that the utility of light can be raised so that light beams emitted from the light source generator 112 will be reflected by the reflecting film 114 to pass through the chamber 122 to the diffuser 116. Furthermore, a plurality of heat pipes 124 are positioned at the contact points of the upside of the housing 118 and the diffuser 116, and each heat pipe 124 can selectively be connected to a radiator piece 126 with high heat conductivity for being a heat transfer interface between the back light unit 110 and the external environment. The light source generator 112 comprises a plurality of fluorescent tubes, wherein the type, shape, and arrangement of the fluorescent tubes are not limited in the present invention. In this embodiment, the light source generator 112 is composed of a plurality of cold cathode fluorescent lamps (CCFL) arranged in parallel with each other in the chamber 122. The housing 118 comprises a flat bottom surface and four inclined sidewalls, which can either comprise alumna or an alloy of other metal materials, or can be composed of a PET film or a PC resin with a reflecting film 114 made from high reflectivity material, such as a metal, on the inside surface. Since the inside surface of the housing 118 contains the reflecting film 114, and the sidewalls of the housing 118 are inclined, the utility of light can be raised.

According to this embodiment, the heat pipes 124 are positioned at the contact points of the upside of the housing 118 and the diffuser 116 so that this arrangement will not influence the light path inside the back light unit 110. Therefore the lightness of the display panel 120 is not reduced by setting the heat pipes 124. The heat pipe 124 can be a solid heat-conductive pipe composed of copper, alumna, tin, or an alloy of the above metal materials. The heat pipe 124 also can be a hollow heat-conductive pipe comprising the above-mentioned metal materials, and the inner portion of the hollow pipe contains a cooling liquid with high specific heat, such as pure water, for transferring the heat produced by the back light unit to the external environment. As a result, the temperature of the internal portion of the back light unit 110 can be balanced so that the rate of thermal dissipation can be raised to reduce the temperature of the entire back light unit 110.

Figure 4:
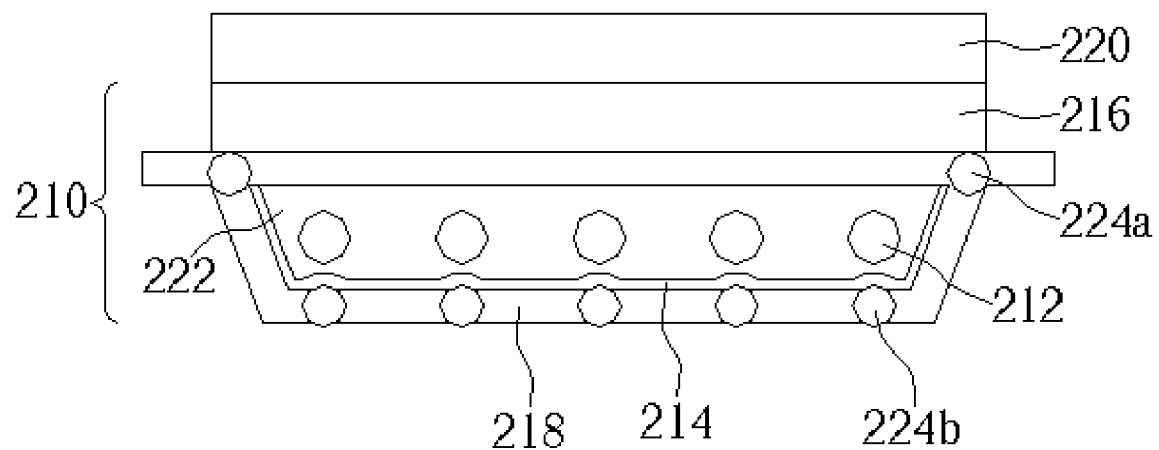
FIG. 4 is a section view of a back light unit according to the second embodiment of the present invention.

Referring to FIG. 4, which is a section view of a back light unit 210 according to the second embodiment of the present invention, the back light unit 210 is a direct-underlying type back light unit set in the backside of a display panel 220. The back light unit 210 comprises a diffuser 216, a light source generator 212 containing a plurality of parallel fluorescent tubes positioned under the diffuser 216, and a housing 218 enclosing the light source generator 212. The sidewalls of the housing 218 extend up and connect to the edge of the diffuser 216 such that a chamber 222 is formed inside the housing 218. The housing 218 further contains a plurality of heat pipes 224a with high heat conductivity positioned at the contact points of the upside of the housing 218 and the diffuser 216, and a plurality of heat pipes 224b with high heat conductivity positioned directly below the florescent tubes in the bottom flat of the housing 118. In this embodiment, the inside surface of the housing 218 and the surface of the heat pipes 224b protruding out of the bottom flat of the housing 218 contains a layer of reflecting film 214 to reflect the light beams emitted from the light source generator 212 to pass through the chamber 222 to the diffuser 216. The characteristic of this embodiment is that the heat pipes 224b are set directly under the fluorescent tubes and have the reflecting film 214 on their arc surface, and it results in a better reflecting effect than the bottom flat of the housing 218 only containing a flat reflecting sheet but without any protruding surface. The material of the heat pipes 224a, 224b and the radiator piece is approximately the same with the first embodiment of the present invention.

Figure 5:
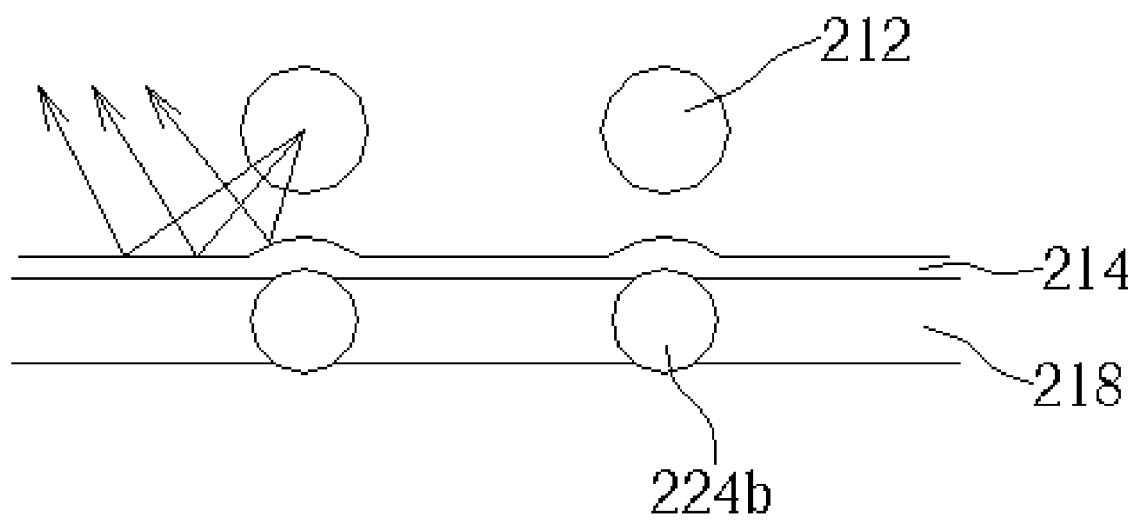
FIG. 5 is a schematic diagram of a reflected light path of the bottom of the housing of the back light unit in FIG. 4.

FIG. 5 is a schematic diagram of the reflected light path of the bottom of the housing 218 of the back light unit 210 in FIG. 4. Light beams from the light source generator 212 are reflected by the arc surface of the heat pipes 224b on the bottom flat of the housing 218 to the sidewalls of the housing 218 and the diffuser 216, and less light beams will be reflected to the fluorescent tubes, thus the light utility can be raised.

Figure 6:
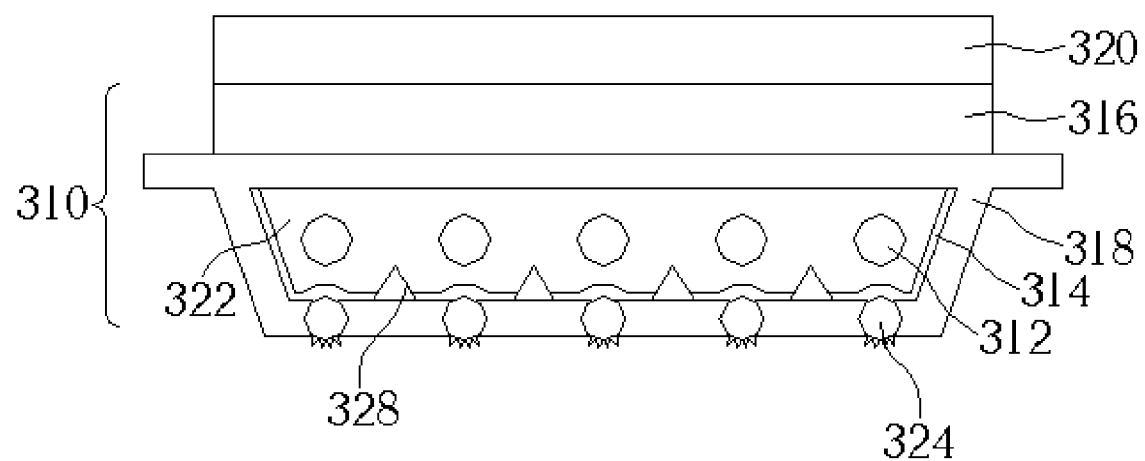
FIG. 6 is a section view of the back light unit according to the third embodiment of the present invention.
Figure 7:
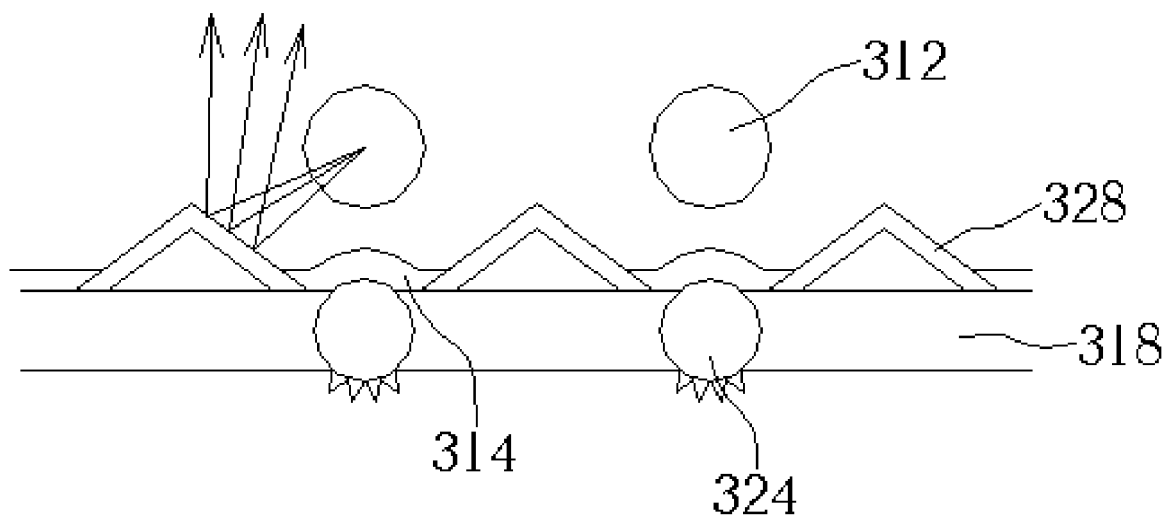
FIG. 7 is a schematic diagram of a reflected light path of the bottom of the housing of the back light unit in FIG. 6.

FIG. 6 is a section view of the back light unit 310 according to the third embodiment of the present invention. FIG. 7 is a schematic diagram of the reflected light path of the bottom of the housing 318 of the back light unit in FIG. 6. The back light unit 310 is a direct-underlying type back light unit positioned in the backside of a display panel 320. The back light unit 310 comprises a diffuser 316, a light source generator 312 containing a plurality of fluorescent tubes positioned under the diffuser 316, and a housing 318 enclosing the light source generator 312, wherein the sidewalls of the housing 318 extend up to the edge of the diffuser 316 to form a chamber 322. Several heat pipes 324 composed of high conductive materials are set in the housing 318. The housing 318 also contains a plurality of reflecting sheet 328 with high radiating tendency on the bottom flat of the housing 318 and a reflecting film 314 covering the inside surface of the housing 318. For increasing the utility of light, the heat pipes 324 are positioned directly below the fluorescent tubes in the bottom flat of the housing 318 with the reflecting film 314 on their surfaces protruding out of the housing 318, and the contact surface of each of the heat pipes 324 and the external environment is a rough surface for increasing the radiating area of the heat pipes 324. For example, the rough surface may comprise a plurality of sharp teeth. The characteristic of this embodiment is that the reflecting sheet 328 set on the bottom flat of the housing 318 can effectively raise light utility so that the lightness of the display panel 320 can be improved. Furthermore, the contact surface of each of the heat pipes 324 and outside environment is a rough surface, thus the radiating area is increased and the rate of thermal dissipation is increased.

In contrast to the prior art, the present invention back light unit contains the heat pipes set in the housing to increase the thermal dissipation, thus the heat accumulation problem in the prior art can be solved. The temperature of the internal portion of the light source generator can be maintained in a uniform state when the present invention back light unit is operated so as to improve the performance and extend the lifetime of the elements of the back light unit. It is another advantage that the path of light beams from the light source generator in the internal portion is considered when setting the heat pipes, therefore the light utility can be raised after positioning the heat pipes.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A back light unit comprising:
   a light source generator positioned in a backside of a display panel for providing light beams to the display panel;
   a diffuser positioned between the light source generator and the display panel for uniformly scattering light beams from the light source generator to the display panel; and
   a housing enclosing the light source generator and connecting to the diffuser for reflecting the light beams to the diffuser, the housing further comprising a heat pipe for being a heat transfer interface between the back light unit and an external environrment;
   wherein the heat pipe overlaps the diffuser in a direction as the light beams enter the display panel from the light source generator.

2. The back light unit of claim 1, wherein the heat pipe is composed of metal materials.

3. The back light unit of claim 1, wherein the material of the heat pipe is selected from copper, alumna, tin, or an alloy of any of the above metal materials.

4. The back light unit of claim 1, wherein the heat pipe is a solid heat-conductive pipe.

5. The back light unit of claim 1, wherein the heat pipe is a hollow heat-conductive pipe, and an inner portion of the hollow heat-conductive pipe contains a cooling liquid.

6. The back light unit of claim 1, wherein the heat pipe is connected to the external environment through a radiator piece for transferring heat to the external environment effectively.

7. The back light unit of claim 1, wherein the heat pipe is positioned at a contact point of the diffuser and an upside of the housing.

8. The back light unit of claim 1, wherein the light source generator comprises a fluorescent tube.

9. The back light unit of claim 8, wherein the heat pipe is positioned directly below the fluorescent tube, and a surface of the heat pipe contains a radiative reflective layer for reflecting light beams from the fluorescent tube.

10. The back light unit of claim 9, wherein the surface of the heat pipe is an arc surface for reducing a rate of light beams emitted from the fluorescent tube being reflected back to the fluorescent tube.

11. The back light unit of claim 1, wherein a contact surface of the heat pipe and the external environment is a rough surface, the rough surface comprising a plurality of sharp teeth so that a radiating area is increased.

12. The back light unit of claim 1 further comprising a diffusion sheet or a prism positioned on the diffuser.

13. A back light unit comprising:
    a light source generator positioned in a backside of a display panel;
    a diffuser positioned between the light source generator and the display panel; and
    a housing enclosing the light source generator and connecting to the diffuser, the housing further comprising a heat pipe having a substantially arc surface;
    wherein the heat pipe overlaps the diffuser in a direction as light beams generated from the light source generator enter the display panel.

14. The back light unit of claim 13, wherein the heat pipe is a solid heat-conductive pipe.

15. The back light unit of claim 13, wherein the heat pipe is a hollow heat-conductive pipe, and an inner portion of the hollow heat-conductive pipe contains a cooling liquid.

16. The back light unit of claim 13, wherein the heat pipe is connected to the external environment through a radiator piece for transferring heat to the external environment effectively.

17. The back light unit of claim 13, wherein the heat pipe is positioned at a contact point of the diffuser and an upside of the housing.

18. The back light unit of claim 13, wherein the heat pipe is positioned directly below the light source generator, and a surface of the heat pipe contains a radiative reflective layer for reflecting light beams from the light source generator.

19. A back light unit comprising:
    a light source generator positioned in a backside of a display panel;
    a diffuser positioned between the light source generator and the display panel; and
    a housing enclosing the light source generator and connecting to the diffuser, the housing further comprising a heat pipe having a rough surface;
    wherein the heat pipe overlaps the diffuser in a direction as light beams generated from the light source generator enter the display panel.

20. The back light unit of claim 19, wherein the rough surface comprising a plurality of sharp teeth.

* * * * *